Figure 1:
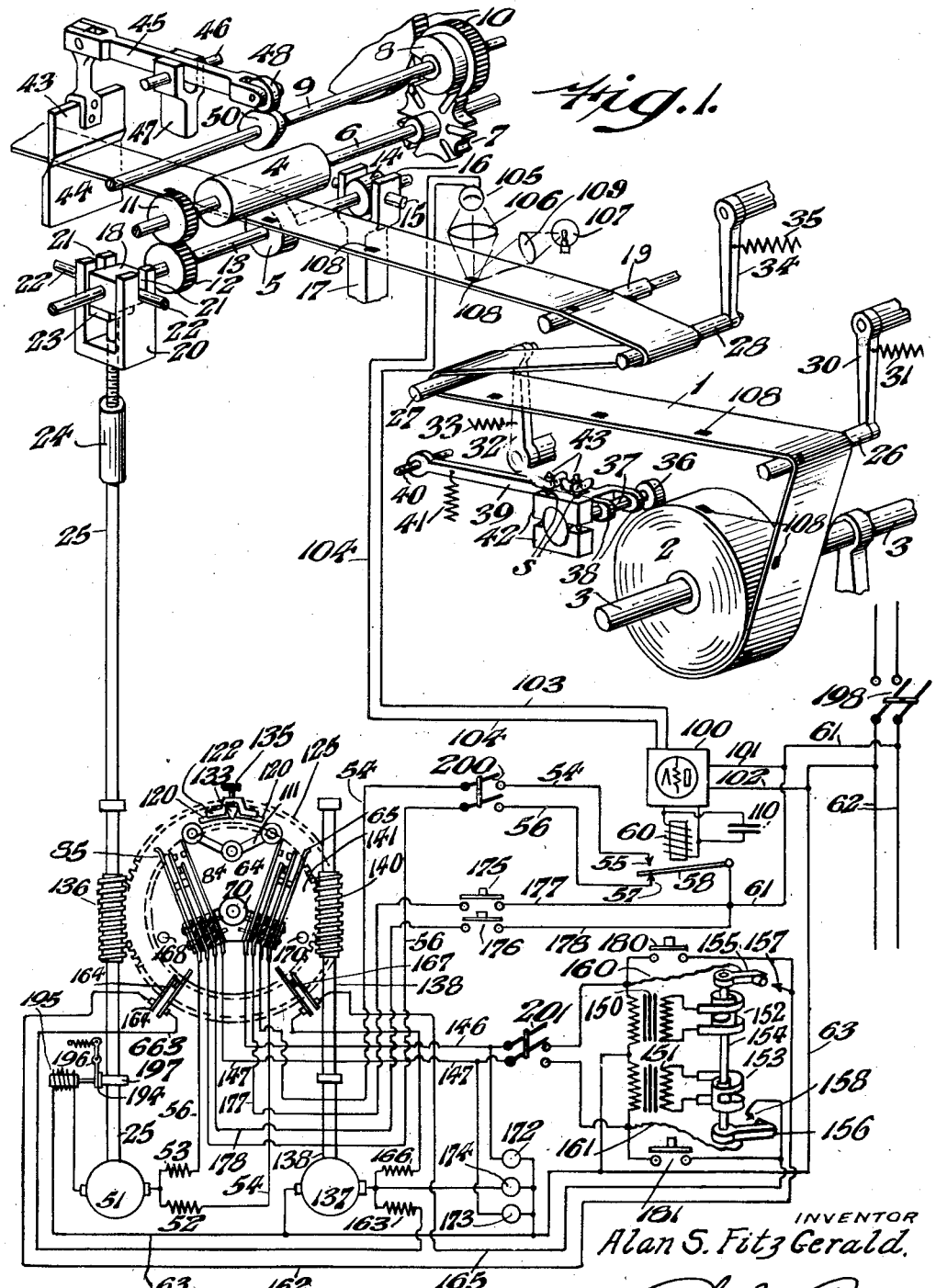

Feb. 15, 1938.   A. S. FITZ GERALD   2,108,767
PAPER REGISTERING SYSTEM
Filed Feb. 27, 1936   3 Sheets-Sheet 1

INVENTOR
Alan S. Fitz Gerald.
BY Robert M. Barr
ATTORNEY

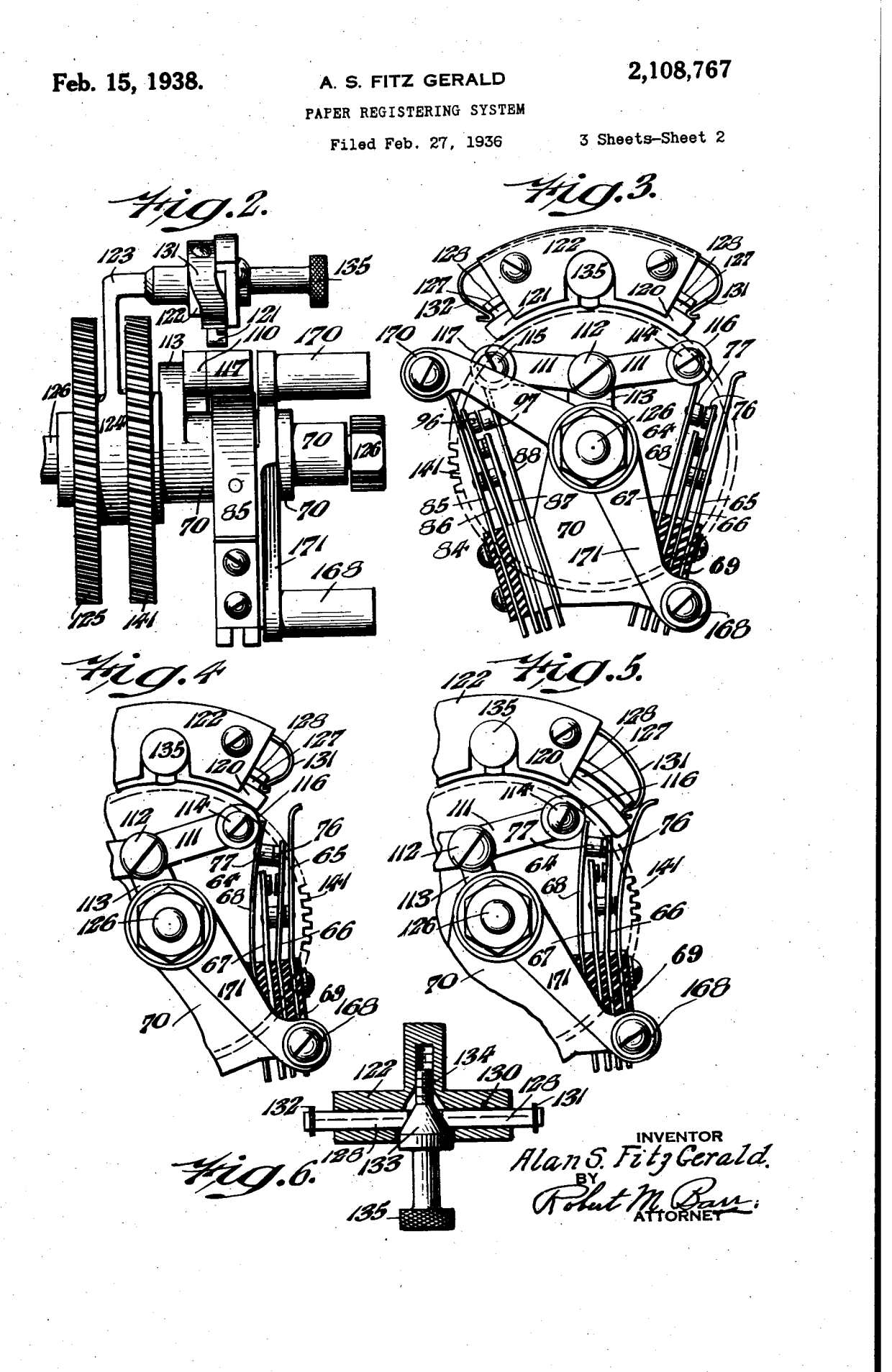

Feb. 15, 1938.   A. S. FITZ GERALD   2,108,767
PAPER REGISTERING SYSTEM
Filed Feb. 27, 1936   3 Sheets-Sheet 3
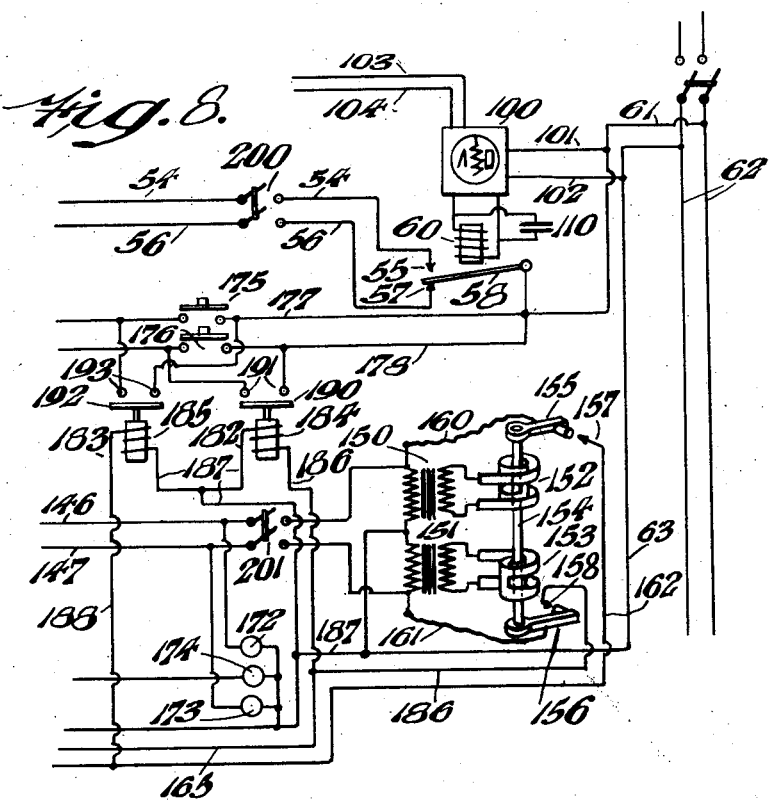
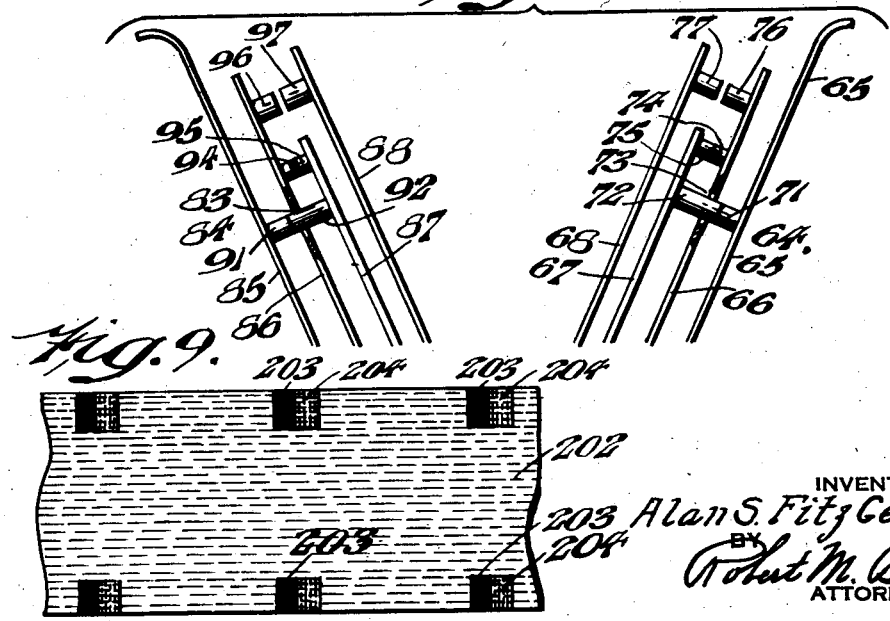
INVENTOR
Alan S. FitzGerald.
BY
ATTORNEY Patented Feb. 15, 1938

2,108,767

UNITED STATES PATENT OFFICE 2,108,767

PAPER REGISTERING SYSTEM

Alan S. Fitz Gerald, Wynnewood, Pa., assignor of one-half to Frank H. Fleer Corporation, Philadelphia, Pa., a corporation of Delaware Application February 27, 1936, Serial No. 66,023

19 Claims. (Cl. 271—2.6)

The present invention relates to packaging and bag-making machines and more particularly to a novel apparatus for severing predetermined lengths of a web or strip of sheet material such as paper, metal foil, "Cellophane" or any other severable material.

In the preferred form of the invention which is taken as illustrating one application of the invention the mechanism is shown assembled in conjunction with a machine for wrapping a piece or pieces of chewing gum, candy, or other confections. In this type of machine it is now the more general custom to provide a strip of wrapping material of considerable length having successive legends, advertising or decorative designs thereon, each of which when severed becomes an individual wrapper for the particular product. Since it is desirable to utilize substantially the whole area of each individual wrapper for the design it at once becomes obvious that the continuous strip of wrapping material must be severed at predetermined positions intervening between each pair of complete designs.

It has heretofore been proposed in machines employing a device for severing lengths of material to use some form of differential gearing to bring about phase or position control plus a suitable speed control since most such machines operate at a relatively high speed. Such constructions have many disadvantages because elaborate and expensive equipment is required which is delicate and sensitive to variations of material feed and other changes of adjustment so that the resulting severance soon takes place at other than the correct place. Another prior type of machine employs means, such as electrical relays and controls, for checking the material when "over-fed" to restore it to its original severing position as nearly as possible. These devices, having a complete control cycle including the action of relay contacts and positioning devices at a frequency of several hundred times a minute cause rapid deterioration of relay contacts and wear of operating parts.

Attention is here directed to the fact that apparatus of the type to which this invention relates commonly operates several hundred times a minute or even more rapidly. From this it is clearly evident that a regulator controlling without an accuracy of one per cent, if applied to paper registration, would be of little use, because the one per cent is cumulative. If such a machine operates only a hundred and twenty times a minute (a somewhat low rate of speed for wrapping machinery) the paper would be ten per cent out of registration at the end of five seconds and fifty per cent out of register at the end of twenty-five seconds, by which time the severing mechanism would be cutting through the middle of a design. The problems incident to correct synchronization of design position, speed of material and severing mechanism have not heretofore been successfully solved.

Some of the objects of the present invention are to provide an improved feed control for a web of material; to provide a speed control for a fed web of material wherein synchronization of the travel of the web with respect to a point or station is maintained substantially constant; to provide a device for increasing and decreasing the rate of travel of a web of material wherein provision is made for preventing the amplitude of rate change on the web from increasing cumulatively; to provide a mechanism responsive to indicia on a web of material which automatically selects a change of web speed to compensate for a variation of operating conditions, and to provide other improvements as will hereinafter appear.

In the accompanying drawings Fig. 1 represents a schematic arrangement of a paper feeding and registering mechanism embodying one form of the present invention; Fig. 2 represents a side elevation of one form of limit switch included as a part of the present invention; Fig. 3 represents a front elevation of the switch showing the parts in inoperative position; Fig. 4 represents a detail elevation of Fig. 3 showing the parts in position to arrest control of the paper for one operating condition; Fig. 5 represents a detail elevation of Fig. 3 showing the parts in position to bring the paper control into operation in response to manual actuation; Fig. 6 represents a detail in section of a device for varying the period of operation of the paper feed; Fig. 7 represents enlarged details of the two multiple limit switches; Fig. 8 represents diagrammatically a modification of one of the controls shown in Fig. 1 to include means for more rapidly bringing the paper into registering position; and Fig. 9 represents a modified form of indicia control.

Referring to the drawings one form of the present invention is shown as applied to an article wrapping machine utilizing a paper web 1 which is arranged to be fed with an intermittent motion to the wrapping apparatus. The paper webs 1 are received for use in roll form and one of them, here called the supply roll 2, is shown mounted for free rotation upon a fixed shaft 3, so that the web can be readily withdrawn therefrom. A guide roller 19 is mounted in a position to support and direct the web 1 in a plane to enter the wrapping apparatus.

For the purpose of withdrawing the web 1 from the roll 2 and feeding it in an intermittent manner, the web 1 is passed between two opposed feed rollers 4 and 5, one of which, preferably 5, is of deformable material such as rubber. The feed roller 4 is fast to a rotatable shaft 6 mounted in suitable bearings, (not shown) and driven by a slotted star wheel 7 of a conventional type of Geneva movement. As the other part of this movement there is the cooperating pin or driving wheel 8 which is fast on a shaft 9 driven by the gearing 10. In accordance with the present invention it has been found desirable to have the Geneva movement so designed that during the cycle of operation the paper remains stationary during approximately three-quarters of each cycle of action and during the remaining quarter of the cycle is in motion. The feed roller 5 is arranged to be driven at the same speed as the feed roller 4 by means of a gear 11 fast on the shaft 6 and in mesh with a like gear 12 fast on a shaft 13 to which the feed roller 5 is keyed. The shaft 13 is mounted at one end in a rocker bearing 14 pivotally supported by pins 15 traversing the bifurcated end 16 of a fixed bracket 17. The opposite end of the shaft 13 is journalled in a bearing block 18 which is mounted to have a sliding motion in a direction at right angles to the plane of the web 1. Accordingly a bifurcated yoke 20 forms a guide for the block 18 and is provided with alined slots 21 in which ride the respective ends of the guide pins 22 of the block 18. Motion is transmitted to the block 18 by a feed plunger 23 passing through the end of the yoke 20 and threading into a bushing 24 keyed to a shaft 25. Thus the block 18 will ride either upwardly or downwardly in the yoke 20 according to the direction of rotation of the shaft 25, and in consequence the pressure of the feed roller 5 on the web will be varied according to operating conditions. As to the diameter of the feeding rolls 4 and 5 it should be noted that this is chosen so that at each action of the Geneva movement the length of paper required to be severed from the web will be advanced. In other words where the paper carries a succession of designs, one for each wrapper, each rotation of the pin wheel 8 will cause a length of paper to be fed corresponding with the distance between corresponding portions of successive designs.

In accordance with the action of the Geneva movement the paper is not fed forward smoothly but is withdrawn intermittently, the paper remaining stationary for a period between each intermittent movement of the feed rollers 4 and 5. In order that the paper may be smoothly withdrawn from the supply roll 2, so that the latter may rotate uniformly and not in a series of jerks, and in order to avoid breaking of the paper due to intermittent feed action, a plurality of spring biased rollers 26, 27 and 28 are provided about which the paper is caused to travel in its path to the feed rollers 4 and 5. The roller 26 is rotatably carried by a rock lever 30 controlled by a tension spring 31. The roller 27 is rotatably carried by a rock lever 32 controlled by a tension spring 33. The roller 28 is rotatably carried by a rock lever 34 controlled by a tension spring 35. The operating positions of the several levers 30, 32 and 34 are such that the web 1 travels in a path having a reverse loop therein which serves as a means for filtering out the intermittent movement of the paper and cause its withdrawal from the supply roll 2 at a uniform speed.

In order to maintain suitable tension upon the paper a friction device is applied to the periphery of the roll 2 consisting of a rubber roller 36 mounted on a spindle 37 journalled in bearings 38 carried by an arm 39 which is pivoted to a fixed support 40. The arm 39 is maintained under tension by a spring 41 secured to hold the roller 36 against the roll 2. A controllable frictional drag is applied to the spindle 37 by means of a split block 42 mounted on the arm 39 and held in gripping relation on the spindle 37 by wing nuts 43. Coil springs "S" are interposed between the wing nuts 43 and the upper face of the split block 42. Adjustment of the nuts 43 regulates the pressure of the split block 42 as will be understood.

As a means for severing the paper a shear blade 43, preferably of the reciprocating type is provided in opposed relation to a fixed blade 44 at the opposite side of the web 1. The shear blade 43 is suspended from one end of a rock lever 45 pivotally mounted at 46 upon a support 47, the other end of which carries a roller 48 arranged to ride upon the face of a wiper cam 50. This cam 50 is made fast to the shaft 9 in such position that its actuating dwell rocks the lever 45 at the proper time in the cycle of operation.

For controlling the operation of the shaft 25, that is to cause it to turn in one direction to increase the pressure of roller 5 so that the web has a forward creep, and to turn it in the opposite direction to decrease the pressure of roller 5 so that the web has a backward creep, an electric motor 51 is provided which is directly connected to the aforesaid shaft 25. This motor 51 is of the reversing type developing a fractional horse-power and is preferably of the split-series field construction. One of these field windings 52 when energized increases the pressure of the feed roller 5 so that the paper is advanced, and the other of these field windings 53 when energized rotates the motor 51 in the reverse direction to decrease the pressure of the feed roller 5 so that a backward creep is imparted to the paper web 1.

In order to automatically make a selection of the proper field winding, either 52 or 53, the winding 52 is connected to a conductor 54 leading to a fixed contact 55, while the winding 53 is connected to a conductor 56 leading to a fixed contact 57. These fixed contacts 55 and 57 are disposed at opposite sides of a movable contactor 58, which, in the present instance, is the armature of a control relay 60. The contactor 58 is connected by a conductor 61 to one side of the source of current 62. The return circuit to the motor 51 from the source 62 is by way of conductor 63.

For breaking the energized field winding 52 when the motor 51 has operated to the desired extent a limit switch 64 is interposed in the conductor 54 and consists of four spring blades 65, 66, 67 and 68 of conducting material. These blades are arranged in spaced apart relation, insulated one from another by blocks of insulation 69, and carried by a rockable body 70. The blade 65 carries a contactor 71 arranged in opposed relation to a contact 72 carried by the blade 67 and traversing an aperture 73 in the blade 66 without contacting with that blade 66. The blade 66 carries a contactor 74 in opposed relation to a contact 75 on the blade 67. The blade 66 projects beyond the blade 67 to locate a contact 76 in opposed relation to a contactor 77 on the blade 68 which is likewise longer than the blade 67. Thus when the circuit including the conductor 54 is closed at contact 55, the current travels from winding 52, conductor 54 to blade 65, contactor 71, contact 72, blade 67, contact 75, contactor 74, blade 66, to the continuation of conductor 54 to contact 55, armature 58, conductor 61, source of current, conductor 63, motor 51, and back to winding 52.

For breaking the energized field winding 53 when the motor 51 has operated to the desired extent, a limit switch 84 is interposed in the conductor 56 and consists of four spring blades 85, 86, 87 and 88 of conducting material. These blades are arranged in spaced apart relation, insulated one from another by blocks of insulation 89, and carried by the rockable body 70. The blade 85 carries a contactor 91 arranged in opposed relation to a contact 92 carried by the blade 87 and traversing an aperture 83 in the blade 86 without contacting with that blade 86. The blade 86 carries a contactor 94 in opposed relation to a contact 95 on the blade 87. The blade 86 projects beyond the blade 87 to locate a contact 96 in opposed relation to a contactor 97 on the blade 88 which is likewise longer than the blade 87. Thus when the circuit including the conductor 56 is closed at contact 57, the current travels from winding 53, conductor 56 to blade 85, contactor 91, contact 92, blade 87, contact 95, contactor 94, blade 86, to the continuation of conductor 56 to contact 57, armature 58, conductor 61, source of current 62, conductor 63, motor 51, and back to winding 53.

For controlling the operation of the relay 60, it is connected to the output of an amplifier 100 which is preferably of the vacuum tube type receiving current by way of the conductors 101 and 102 from the source of current 62. The input of the amplifier 100 is in a circuit including conductors 103, 104, and a photo-electric cell 105, which latter is mounted to receive rays of light from a lens 106. The lens 106 is located to receive light rays reflected from a face of the paper web 1, and in this instance a narrow concentrated band of light is projected upon the web at the proper place for such action. A light source 107 and lens 109 properly mounted for the purpose direct the required beam of light upon the web 1. This beam of light and photo-electric cell 105 operate in association with index marks 108 in the form of black printed dots or sections on the web, these marks 108 being respectively located so that when the paper is at rest the leading edge of one mark will be entering the light field. The relation of the marks 108 to the light area and to the shearing means 43 is such that the latter is exactly between two successive designs when a dark index mark 108 comes to rest so that its leading edge is just entering the illuminated area, and as a result when the cut is made one complete design is severed from the length of web. It will thus be evident by the foregoing arrangement that, if the paper be threaded up so that a portion of a dark index mark 108 comes to rest in the spot of light during the stationary period, the light falling upon the photo-electric cell 105 will be such that the relay contact 57 will be closed. It is important to note that due to the intermittent motion of the paper, the photo-cell 105 will receive, transiently, during the quarter of the cycle while the paper is in motion, reflected light other than that which is received when the paper is at rest. If the paper comes to rest "dark" the photo-cell will receive intermittent light flashes. Conversely, if the paper comes to rest "light" there will be transient dark periods while the paper is being fed forward. The expression "dark" is used to designate the condition when the paper comes to rest so that the light source upon the black index mark and the photocell is not substantially illuminated. Similarly, the expression "light" is intended to convey that the paper comes to rest so that light falls upon a white portion, the photocell being thereby illuminated. Due to these conditions it is desirable to connect a condenser 110 in parallel with the relay 60 and having a suitable value in relation to the frequency of intermittency. The value of this condenser will be substantially greater than the customary value in such application, when the amplifier is operated from alternating current energy, which condenser has then only the function of smoothing out power frequency variations due to the rectifying action of the amplifier. The value of the condenser 110 also depends on the relay resistance. If the resistance is from five thousand to ten thousand ohms it has been found a condenser capacity of from five to ten micro-farads is satisfactory. With this value of capacity, the relay remains firmly on either contact 55 or 57 so long as the paper always comes to rest at a similar position. The relay does not follow the intermittent action of the paper. Action of the relay is only caused when a change takes place from a condition in which the paper comes to rest "light" to that in which it comes to rest "dark", or vice versa. Thus, the relay 60 gives a steady indication of whether the paper comes to rest with the index mark in the spot of light, or with the spot of light falling on a portion of the paper other than the index mark.

In order to automatically control the operation of the limit switches 64 and 84, a rocker 111 is provided and pivoted at its middle on a stud 112 which is carried by an arm 113 integral with the body 70. The ends of the rocker 111 terminate respectively in laterally disposed pins 114 and 115 which serve respectively as bearings for rollers 116 and 117 of fiber or other insulating material. The length of the rocker 111 and its position relative to the body 70 is such that the roller 116 is located in close proximity to the free end of the blade 68 of limit switch 64, while the roller 117 is located in close proximity to the free end of the blade 88. As a consequence of this arrangement the arc of travel of each roller will intercept the adjacent switch blade to thereby control a particular circuit.

As a means for moving the rocker 111 according to requirements two segment shaped tappets 120 and 121 are carried by a block 122 mounted on an L-shaped arm 123 formed as an extension of a hub 124 which has a worm gear 125 fixed thereto. Both the hub 124 and the body 70 are rotatably carried by a fixed spindle 126, though each is movable relative to the other. The radial distance of the tappets 120 and 121 from the spindle 126 is such that swinging movement thereof in either direction will engage one or the other of the rollers 116 and 117 to cause operation of a limit switch. The sides of each tappet 120 and 121 are grooved as indicated at 127 to form an undercut head 128 which rides in a slot 130 of the block 122. Spring fingers 131 and 132 are provided respectively at opposite ends of the block 122 to act as retainers for the tappets 120 and 121 so that each will be held in place and abutting a tapered head 133 which is formed as a part of an adjusting screw 134. This screw 134 is threaded into the block 122 and has a knurled head 135 projecting conveniently for hand manipulation. Turning this screw 134 in one direction will separate the tappets 120 and 121 so that the limit switches are actuated earlier in the cycle, and turning the screw 134 in the opposite direction will bring the aforesaid tappets together so that the limit switches are actuated later in the cycle.

In order to have the limit switch properly responsive to the control of the paper web feed, the spindle 126 is so mounted that the worm gear 125 is in mesh with a worm 136 on shaft 25.

From the foregoing it will be evident that if the paper be initially set so that upon starting the machine the leading edge of a dark index mark 108 is just entering the light spot, then relay 60 will be energized to close contact 55. Therefore the motor 51 will turn the shaft 25 in a direction to rotate the tappet block 122 in a clockwise direction. The kinematic image of the design will then slowly advance so that shortly the light spot is eclipsed by the entrance of the dark index mark 108. This will cause the relay 60 to open the contact 55 and close contact 57 so that the motor 51 is reversed and the tappet block 122 caused to travel counter-clockwise to initiate a backward creep of the paper. As soon as this occurs the white portion of the paper will again enter the light spot thereby causing the relay to again close the contact 55 so that the motor 51 reverses the direction of the shaft 25 and again causes the tappet block 122 to rotate in a clockwise direction until it is stopped by the limit switch due to the tappet block 122 causing the contact blades 66 and 67 to break contact as shown in Fig. 4. The paper therefore is again given a forward creep. Thus the paper "hunts" between an advanced position determined by the leading edge of the dark spot when located so that the light spot is completely eclipsed, and a position such that the leading edge of the dark spot is just about to enter the illuminated area. This "hunting" action takes place at a speed substantially slower than the speed of operation of the machine. The gear 125 operates back and forth at a relatively slow speed of several times a minute, as compared with a speed of several hundred operations of the wrapping machine.

The amplitude of oscillation of the tappet block 122, adjustable by means of the screw head 133 in practice, corresponds to the uniformity of the paper and operating conditions. It will readily be appreciated that there are a number of circumstances which may possibly affect the uniform operation of apparatus of the general type referred to. For example, the wrapping paper is usually waxed, and in accordance with climatic conditions, the waxed paper tends to adhere to itself on the roll to a greater or less degree, thus affecting the tension of the paper as it is withdrawn from the roll. Likewise, the paper is liable to shrinkage during storage and in accordance with the humidity and temperature. Furthermore, due to similar variations during the process of printing the spacing of the printed legend is likewise subject to small variations. The amount of travel of the tappet block must be sufficient to produce reversal of the direction of "creep" of the paper. The wider the amplitude of oscillation permitted, the greater is the speed of forward and backward "creep" respectively that results. This is because the greater the amount of angular travel of the tappet block 122 which is permitted, the greater is the corresponding motion of the gear 125 and accordingly the more widely separated are the maximum and minimum limits between which the pressure upon the roller 5 is permitted to vary. Thus, if conditions are very uniform and there are no extraneous interfering factors, the oscillation of the tappet block 122 may be held to very close limits and the regulation of the paper will be correspondingly limited to a small amplitude of "hunt". If, on the other hand, a change in condition takes place, such as a variation in the printing or some change in friction in the paper feed, the limits of movement of the tappet block 122 will be insufficient to cause enough change in the pressure applied to the feed roll 5 to give rise to a reversal of the direction of "creep". In other words, the amplitude of movement of the block 122 must be sufficient, taking into consideration all variable factors, to cause a reversal of direction.

For general operating conditions and with such variable factors in mind it has been found that further automatic controlling features capable of automatically correcting for such variations, may advantageously be furnished.

For this purpose a motor 137, preferably of the reversing type developing a fractional horsepower and of split-series field construction, is provided and arranged to drive a shaft 138 having a worm 140 thereon in mesh with a worm gear 141 which is fast to or integral with the body 70. Thus while the worm wheel 125 and tappet body parts are rotatable on the same spindle 126 as are the worm gear 141 and body 70, the two sets of parts are also capable of relative rotation. Preferably it is desirable to maintain a rather close regulation and to that end the adjusting screw head 133 is set to provide a relatively small amplitude of travel of the tappet block 122. If under some changed operating condition this small travel does not produce reversal of direction of "creep", rotation of the worm 140 in an appropriate direction, re-locates the two limit switches carried by the body 70, thereby causing the pressure applied to roller 5 to vary, so that a new position is found which furnishes reversal of direction. In other words, if before adjustment of worm gear 141 the pressure applied to roller 5 varies between two pre-determined limits differing by a given amount, it will, after re-adjustment of gear 141, vary between two other limiting pressures differing by an equal amount, but both limits displaced either in one direction or the other as may be required.

In order that this readjustment can be made automatically the limit switch blade 66 is provided with the contact 76 located in opposed relation to the contactor 77 on the blade 68. Likewise the limit switch blade 86 is provided with the contact 96 located in opposed relation to the contactor 97 on the blade 88. Conductors 146 and 147 are respectively connected to the switch blades 68 and 88. The conductor 146 leads to the primary winding of a transformer 150, the secondary winding of which is of relatively large cross section suitable for supplying current of high amperage and relatively low voltage. The conductor 147 leads to the primary winding of a second transformer 151, the secondary winding of which is also of relatively large cross-section suitable for supplying current of high amperage and relatively low voltage. The two aforesaid primary windings are suitable for energization at the voltage of the source 62. The secondary windings are respectively connected directly to two bimetallic strips 152 and 153, each of which is of elongated U-shape and coiled into helical form, one, however, being coiled in the opposite direction from the other so as to operate differentially. The free or closed ends of the strips 152 and 153 are connected to an insulating block 154 (shown diagrammatically as an elongated strip) having contactors 155 and 156 for engagement respectively with the contacts 157 and 158. The contactors 155 and 156 are respectively connected to the conductors 146 and 147 by flexible connectors 160 and 161. The contact 157 is connected by a conductor 162 leading to the field winding 163 of the motor 137, and a normally closed switch 164 is included in the circuit of conductor 162. The contact 158 is connected by a conductor 165 to the other field winding 166 of the motor 137, and a normally closed switch 167 is included in the circuit of conductor 165. The two switches 164 and 167 are fixedly mounted adjacent to the gear 125 and are designed to be opened by trip rollers 168 and 170 here shown as mounted on an arm 171 integral with the body 70, both serving as a safety means to prevent over-running of the motor 51, when the mechanical limits of the tappet control have been reached.

From the foregoing it will be observed that under normal conditions when the forward and rearward "creep" of the paper are substantially equal, bi-metallic strips 152 and 153 will be energized for approximately equal periods, and will accordingly apply equal and opposing torsional forces to the contact block 154. The contacts 157 and 158 are normally open under this condition and no energization of motor 137 results.

Assuming that due to some change in operating conditions, such as those heretofore explained, the paper is fed forward insufficiently, this, results in inequality of duration of energization of the conductors 146 and 147, and the conductor 146 will be energized to a greater extent than the conductor 147. This will cause unequal heating of the bi-metallic strips 152 and 153 which, no longer exerting balanced forces upon the block 154, will move the movable contacts in a direction tending to close contacts 155 and 157.

It is especially to be noticed that energization of either of the primary windings of transformers 150 and 151 can only be affected so long as one or the other of the relay contacts 55 and 57, and the corresponding "make" contacts 74 and 94 of the limit switches are closed. Energization of the transformer windings therefore, cannot take place except while gear 125 is in one or the other of its stationary positions or extremities.

For example, suppose that a white portion of the paper has, for a few moments, been exposed to the light spot and, as a result, relay contact 55 has been closed. The gear 125 will have rotated to its extreme clockwise position and transformer 150 will be energized. Suppose now the paper "creeps" forward slightly so that a dark portion of the registering index mark moves into the light spot. This will cause the relay to open contact 55 and close contact 57. Immediately when this happens, transformer 150 is de-energized. Only after the gear 125 has rotated to its extreme counter-clockwise position, operating the opposite limit switch is transformer 151 energized.

The bi-metallic strips 152 and 153 being of substantial thickness take a few seconds to become heated by the transformer secondary currents when energized, and to cool when the transformers are deenergized accordingly, at the frequency at which the "hunting" action takes place, the contacts 155 and 156 do not visibly oscillate. Under all normal conditions, the contacts of the thermostatic device remain open. The effect, however, of the thermostatic device is to give a preresponsive action in respect to a tendency towards change in the operating condition.

Before a condition is reached such that the limits of travel of the tappet block 122, and accordingly the pressure limits between which the roller 5 varies do not permit reversal of the direction of "creep" to be produced, the thermostatic device anticipates the changed conditions and automatically repositions the limit switches 64 and 84 by rotating the member 70 slightly in one direction or the other, as may be required.

When the position of the member 70, which carries the switches 64 and 84, is precisely correct for the operating conditions, paper quality, etc., the movement of the tappet block 122 under forward creep action is approximately equal to its movement under backward creep action, the two switches 64 and 84 limiting the respective movements. Under these conditions, the duration of energization of the transformers 150 and 151 respectively, which is initiated when 122 is arrested in either position by one or other of the limit switches and which is terminated when the relay 60 operates in response to the reversal of the paper which results from the change in the pressure applied to the roller 5, is equal. When, however, conditions so that the position of 64 and 84 is no longer correct, the forward "creep" which occurs when 122 is arrested in the clockwise position by 64 may no longer be equal to the backward "creep" which results when 122 is arrested by 84 in the counter-clockwise position. When this occurs, reversal of direction of "creep" will be brought about more readily in the direction in which the "creep" is least and will take longer to affect in the direction in which the "creep" is greater. Accordingly, energization of 150 and 151 will not longer be equal. For example, suppose the conditions are such that the forward "creep" is somewhat greater than the backward "creep". Under this condition when the index mark moves into the light spot and relay 60 drops out closing contact 57, the pressure on 5 will be automatically slightly reduced and in due course, if the conditions of inequality are slight, the "creep" will commence to take place in the backward direction until the index mark move backwards out of the light spot. This will cause relay 60 to pick up, closing contact 55 and the pressure upon the roller 5 will again be augmented. Because of the greater tendency in favor of the forward "creep", the response to this action of the relay will be more prompt than was the case in the other direction. Accordingly under these conditions, the tappet block 122 will be stationary for more prolonged periods in the counter-clockwise direction than will be the case in the clockwise direction. Accordingly the integrated period of energization of 151 will exceed the energization of 150. Thus 153 will attain a higher temperature than 152. This will result in closing contacts 156, 158, which will cause motor 137 to reposition 64 and 84 in the counter-clockwise direction which will bring about equality of backward and forward "creep" and accordingly equal durations of heating of 150 and 151.

For facilitating supervision and putting the apparatus into action at the commencement of a run of the wrapping machine, two electric signal lamps 172 and 173 are provided and connected respectively in parallel with the primary windings of the two transformers 150 and 151. A third signal lamp 174 is located in a circuit arranged to be energized whenever current is supplied to the motor 137. Under normal operating conditions the lamps 172 and 173 are illuminated intermittently and alternately for equal periods. Should a change in the uniformity of operating conditions such as explained take place an inequality of the duration of the illumination of the lamps 172 and 173 will at once be observable. This is because lamps 172 and 173 are energized concurrently with transformers 150 and 151. If this condition persists a momentary illumination of the lamp 174 will occur which indicates that the motor 137 is now in operation to reposition the gear 141 and associated parts. In practice it has been found that usually the lamps 172 and 173 are lighted at intervals of several seconds, while the lamp 174 is lighted several times in an hour or more.

In order to initially operate the control mechanism so that the design on the paper can be manually "framed", two normally open push buttons 175 and 176 are provided, the former being in the circuit of a conductor 177 leading from conductor 61 to the blade 67 of limit switch 64, and the latter being in the circuit of a conductor 178 leading from the conductor 61 to the blade 87 of limit switch 84.

If the paper be threaded, with the machine at rest, so that when it is started the design is considerably out of register, the automatic action of the relay 60 will in due course tend to bring it into the proper position. However, the normal movement of the gear 125 is very small and the positions in which the gear 125 is arrested by the limit switches 64 and 84 are such as to give very slow rates of forward and rearward "creep". It is, therefore, convenient to provide the aforesaid push button control for obtaining a substantially greater rate of forward or rearward "creep" when it is desired manually to control the position of the paper, so that a more rapid response may be obtained.

By reference to the diagram of Fig. 1 it will be seen that if the design is rearward of the proper position so that the gear 125 has come to rest in the clockwise direction, the limit switch 64 operated, the motor 51 will have been stopped by the opening of contacts 74 and 75. This will give a very slow rate of forward "creep". If, now, push button 175 be depressed this will have the effect of short circuiting the break between 74 and 75 by establishing a circuit from switch blade 67, contact 72, contact 71 to the blade 65 and thence to the field winding 52 of the motor 51. Motor 51 may, therefore, again operate to turn the gear 125 in a clockwise direction and still further increase the pressure upon roll 5. The construction of the rocker 111 permits of further movement of the tappet block 122 without deformation of the spring blades 68, 66, because the tappet passes over the roller 116 and, with additional rotation of the gear 125 directly engages the switch blade 65, thereby opening the motor circuit and arresting the gear 125 at a new position shown in Fig. 5 which gives a rapid forward "creep". The button 175 being now released, the paper is quickly drawn forward until the trailing edge of the mark 108 enters the light spot. The relay 60 now closes contact 57 and the gear 125 rotates in a counter-clockwise direction, coming to rest with the limit switch 64 in the position shown in Fig. 4. This gives the normal, slow, backward "creep" and the paper is thereafter automatically registered in the normal manner as hereinbefore described. Similar action is, of course, provided in the opposite direction by means of the push button 176.

While the apparatus just described serves to manually frame the design under starting conditions there is often necessary a further adjustment of the worm gear 125 to correct for initial conditions, or different quality of paper, or variations in the printing. To take care of such contingencies two additional push buttons 180 and 181 are provided and connected respectively in parallel with the contacts 157 and 158. Therefore by closing one of the push buttons 180 and 181 according to the direction to be given the paper, the motor 137 can be immediately operated to reduce the rate of "creep" to a substantially stationary effect. Thereafter one of the push buttons 175 or 176 can be closed and the framing of the paper done accurately. Thus in normal practice when a machine is stopped, for example at the end of a working period, or for threading a new roll of paper, the position of the gear 141 will be correct for proper registration. Therefore in resuming operation of the machine it is only necessary to thread the paper when the machine is at rest so that the paper is properly registered, or after starting the machine to frame it by one or the other of the push buttons 174 and 175. When, however, a machine is started for the first time it is generally necessary to make an adjustment of the position of the gear 141. Also this adjustment may be made necessary by other varying conditions such as those heretofore referred to. The operator can visually tell whether the gear 141 is properly positioned by watching the action of the web. Thus, if the position of the gear 141 is correct, (whether or not the position of the design on the paper is in register or not) when the machine is started the kinematic image of the design will be substantially stationary, and the normal "creep" will be very slow. If the position of the gear 141 is not quite correct the "creep" will be more noticeable. Then by depressing one or the other of the push buttons 180 and 181, according to whether advance or retard is necessary, the motor 137 can be immediately operated so that the rate of "creep" is reduced to a substantially stationary effect. With this accomplished, operation of the required button 175 or 176 will make correct framing possible.

In Fig. 8 a modified form of the invention is shown wherein two relays 182 and 183, having operating coils 184 and 185 included in a circuit comprising conductors 186, 187 and 188 are so connected to the circuit of the thermostatic control as to be in parallel relation with the circuits operated by the contacts 157 and 158. The relay 182 is arranged to operate a contactor 190 for closing contacts 191 in the conductor 178, while the relay 183 has a contactor 192 arranged to close contacts 193 in the conductor 177. These two sets of contacts 191 and 193 are respectively in parallel relation to the push button controls 175 and 176 and perform the same function as do these push buttons, but do it automatically. It will therefore be obvious that whenever one of the contacts 157 or 158 is closed the corresponding relay 182 or 183 will be energized to thereby operate its contactor and cause the motor 51 to rotate in the required direction to vary the rate of feed of the paper web. This serves as a relatively rapid restoring of normal operating conditions and is useful in correcting a suddenly manifested displacement from register of the web, such as might be caused by the breakage of the paper during printing, and the paper having been rejoined without proper continuity in respect to the design and registering indicia 108. Also in the event that the printing mechanism should become temporarily defective so that a length of paper having no registering indicia thereon is fed to the machine, there would be a period when the automatic control heretofore described would be out of action, and the paper completely out of register when the printing and indicia again reappears on the paper. While the automatic mechanism heretofore described will eventually allow the paper to creep through a distance equal to the extent of the discrepancy, the apparatus of the modified form will make such correction far more rapidly.

In connection with the operation of the shaft 25 by its motor 51, while it is desirable that the motor be of the quick starting type, it is equally undesirable that the same should have any tendency to overrun by reason of its momentum, after the motor circuit is opened by one or the other of the limit switches. To remedy this condition an automatic braking device may be employed consisting of a brake shoe 194 arranged to be operated by a solenoid 195 included in the motor circuit. A spring actuated armature 196 normally holds the shoe 194 against a drum 197 fast to the shaft 25 as long as the motor is not energized, but is immediately retracted when the motor is energized by reason of the series connected solenoid 195.

For manual control of the respective circuits a conventional main switch 198 is located in the source line, while double pole switches 200 and 201 are connected respectively in the circuit of relay 60 and in the circuit which includes the transformers 150 and 151.

In Fig. 1 the index mark of the web is shown as a similar dark spot. When the index mark does not come to rest in the illuminated area, the light is reflected by the normal material of the web. For instance, as is often the case, the web is of paper, under the latter condition the light is reflected from the surface of the paper. With ordinary paper the manner in which the light is reflected from the surface of the paper on to the photocell 105 through the lens 106 tends to be diffused rather than specular. That is to say, the angle of incidence between the rays of light approaching and leaving the paper are not critical.

Where highly glazed paper, metal foil, or the like is employed, specular reflection may take place to a large extent and under this condition the intensity of the light falling upon the photocell 105, and therefore the magnitude of the photoelectric current received by the amplifier 101, may be subject to variations of substantial extent should there be any slight variation in the angles of incidence. Should this be the case, more adjustment of the positions of the light source, photocell and lenses, is necessary, and if this adjustment should not be accurately maintained due to vibration of the machine, etc., this may affect the response of the photo-electric apparatus.

Exact tracking of the paper is of like importance since a slight change in the angle of the surface of the paper would similarly affect the angle of incidence.

When metal foil or other material which has a surface giving specular reflection is used it is preferred to employ as an index mark on the web, pigmented indicia having two adjacent fields, one light and one dark. The pigment should be opaque and may have a matt surface. In this manner, either paper or metal foil may interchangeably be used without modifying the adjustments of the machine.

Fig. 9 shows a portion of a web 202 wherein each index mark consists of two fields 203 and 204 for the purpose indicated above.

From the foregoing description of the apparatus of the present invention it will be apparent that a web control has been devised wherein the travel of the web is always maintained synchronized with respect to a point, such as that where the severing knives 43 and 44 are located. The function of the apparatus is not only to bring about an acceleration and deceleration of the web according to conditions but also to prevent the amplitude of rate change of the web from increasing cumulatively.

In this connection it should be noted that the relay 60 and the motor 51 alone will not give the desired type of control and would only cause a condition of instability. This is because the correcting action would be cumulative and the material would oscillate back and forth with a steadily increasing amplitude until it fell out of synchronism entirely. In other words a condition would be reached where the paper would either be having a constant backward creep or a constant forward creep and there would be no possibility of automatically shifting from one kind of creep to the other.

By the use of the described limit switches this amplitude is maintained constant and as a result the relation between the indicia of the web and the point of severance is maintained constant. Furthermore ingenious supplemental mechanism are provided whereby the action of the limit switches can be altered at will to suit different existing conditions and this may be done manually or automatically. In doing this automatically a novel energy storing selecting means is provided wherein the rate change can be increased or decreased to re-establish more correctly the proper phase relation or for the purpose of either initially or at any other time framing the web.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. A material feed control comprising the combination of a device for feeding a web of material past a predetermined point, said web having indicia in spaced relation thereon, a mechanism for increasing and decreasing the rate of web feed, means responsive to a change of phase relation of said indicia to said point to actuate said mechanism to both increase and decrease the rate of web feed according to said change of phase relation, and means associated with said responsive means to prevent the amplitude of rate change on said web from increasing cumulatively, whereby substantially constant phase relation between said indicia and said point is maintained.

2. A material feed control comprising the combination of a device for feeding a web of material, a mechanism for increasing and decreasing the rate of web feed, means for actuating said mechanism automatically to both increase the rate of feed when the feed is too slow, and decrease the rate of feed when the feed is too fast, and means associated with said actuating means to prevent the amplitude of rate change in said web from increasing cumulatively.

3. A material feed control comprising the combination of a device for feeding a web of material past a predetermined point, said web having indicia in spaced relation thereon, a mechanism for increasing and decreasing the rate of web feed, means responsive to a change of phase relation of said indicia to said point to actuate said mechanism to increase and decrease the rate of web feed, and means associated with said responsive means to prevent the amplitude of rate change on said web from increasing cumulatively, said preventing means including circuit controlling limit switches for respectively stopping rate changes after a predetermined interval.

4. A material feed control comprising the combination of a device for feeding a web of material past a predetermined point, said web having indicia in spaced relation thereon, a mechanism for increasing and decreasing the rate of web feed, means responsive to a change of phase relation of said indicia to said point to actuate said mechanism to increase and decrease the rate of web feed, means associated with said responsive means to prevent the amplitude of rate change on said web from increasing cumulatively, said preventing means including circuit controlling limit switches for respectively stopping rate changes after a predetermined interval, and means for varying the position of said limit switches relative to said responsive means while maintaining a constant relation between said switches, whereby a different limit control can be established at will.

5. A material feed control comprising the combination of a device for feeding a web of material past a predetermined point, said web having indicia in spaced relation thereon, a mechanism for increasing and decreasing the rate of web feed, means responsive to a change of phase relation of said indicia to said point to actuate said mechanism to increase and decrease the rate of web feed, means associated with said responsive means to prevent the amplitude of rate change on said web from increasing cumulatively, said preventing means including circuit controlling limit switches for respectively stopping rate changes after a predetermined interval, and means including an energy storage control for varying the position of said limit switches relative to said responsive means while maintaining a constant relation between said switches, whereby a different limit control can be established at will.

6. A material feed control comprising the combination of a device for feeding a web of material past a predetermined point, said web having indicia in spaced relation thereon, a mechanism for increasing and decreasing the rate of web feed, means responsive to a change of phase relation of said indicia to said point to actuate said mechanism to increase and decrease the rate of web feed, means associated with said responsive means to prevent the amplitude of rate change on said web from increasing cumulatively, said preventing means including circuit controlling limit switches for respectively stopping rate changes after a predetermined interval, and means including an assembly for selectively varying the position of said limit switches relative to said responsive means while maintaining a constant relation between said switches, whereby a different limit control can be established at will.

7. A material feed control comprising the combination of a device for feeding a web of material past a predetermined point, said web having indicia in spaced relation thereon, a mechanism for increasing and decreasing the rate of web feed, means responsive to a change of phase relation of said indicia to said point to actuate said mechanism to increase and decrease the rate of web feed, means associated with said responsive means to prevent the amplitude of rate change on said web from increasing cumulatively, said preventing means including circuit controlling limit switches for respectively stopping rate changes after a predetermined interval, and means for varying the limit points of operation of said limit switches, whereby the time of operation of each rate change is fixed.

8. A material feed control comprising the combination of a device for feeding a web of material, a mechanism for increasing and decreasing the rate of web feed, means for automatically actuating said mechanism according to feed variations, and means associated with said actuating means to prevent the amplitude of rate change in said web from increasing cumulatively, said preventing means including circuit controlling limit switches for respectively stopping rate changes after a predetermined interval, an oscillatable control member operated by said actuating means and arranged to operate said switches respectively at the ends of its stroke, and means to vary the amplitude of oscillation of said control member, whereby the time of rate change is varied.

9. A material feed control comprising the combination of a device for feeding a web of material, a mechanism for increasing and decreasing the rate of web feed, means for automatically actuating said mechanism according to feed variations, and means associated with said actuating means to prevent the amplitude of rate change in said web from increasing cumulatively, said preventing means including circuit controlling limit switches for respectively stopping rate changes after a predetermined interval, an oscillatable control member operated by said actuating means and arranged to operate said switches respectively at the ends of its stroke, and means to adjust said switches bodily with respect to said control member.

10. A material feed control comprising the combination of a device for feeding a web of material, a mechanism for increasing and decreasing the rate of web feed, means for automatically actuating said mechanism according to feed variations, and means associated with said actuating means to prevent the amplitude of rate change in said web from increasing cumulatively, said preventing means including circuit controlling limit switches for respectively stopping rate changes after a predetermined interval, an oscillatable control member operated by said actuating means and arranged to operate said switches respectively at the ends of its stroke, and manually actuated means to adjust said switches bodily with respect to said control member.

11. A material feed control comprising the combination of a device for feeding a web of material, a mechanism for increasing and decreasing the rate of web feed, means for automatically actuating said mechanism according to feed variations, and means associated with said actuating means to prevent the amplitude of rate change in said web from increasing cumulatively, said preventing means including circuit controlling limit switches for respectively stopping rate changes after a predetermined interval, an oscillatable control member operated by said actuating means and arranged to operate said switches respectively at the ends of its stroke, and an automatically actuated means to adjust said switches bodily with respect to said control member.

12. A material feed control comprising the combination of a device for feeding a web of material, a mechanism for increasing and decreasing the rate of web feed, means for automatically actuating said mechanism according to feed variations, and means associated with said actuating means to prevent the amplitude of rate change in said web from increasing cumulatively, said preventing means including circuit controlling limit switches for respectively stopping rate changes after a predetermined interval, an oscillatable control member operated by said actuating means and arranged to operate said switches respectively at the ends of its stroke, and means including a reversible motor for bodily moving said switches with respect to said control member, two circuits for said motor, and an energy storage assembly for automatically selecting one or the other of said circuits according to operating conditions.

13. A material feed control comprising the combination of a device for feeding a web of material past a predetermined point, said web having indicia in spaced relation thereon, a member arranged to vary the rate of web feed, a dual control assembly for causing said member to increase or decrease the rate of web feed, a mechanism responsive to a change of phase relation of said indicia to said point for selectively actuating said dual control to cause said member to vary the rate of web feed to restore said phase relation, and means to prevent the amplitude of rate change on said web from increasing cumulatively, whereby a substantially constant phase relation between said indicia and said point is maintained.

14. A material feed control comprising the combination of a device for intermittently feeding a continuous web of material past a predetermined point, said web having indicia in spaced relation thereon, said device including a deformable member arranged to vary the rate of web feed, a dual control assembly for causing said member to increase or decrease the rate of web feed, a mechanism responsive to a change of phase relation of said indicia to said point for selectively actuating said dual control to cause said member to vary the rate of web feed to restore said phase relation, and means to prevent the amplitude of rate change on said web from increasing cumulatively, whereby a substantially constant phase relation between said indicia and said point is maintained.

15. A material feed control comprising the combination of a device for intermittently feeding a continuous web of material past a predetermined point, said web having indicia in spaced relation thereon, said device including a deformable member arranged to vary the rate of web feed, a control assembly for causing said member to function, a mechanism responsive to a change of phase relation of said indicia to said point for actuating said control assembly to restore said phase relation, and means to prevent the amplitude of rate change on said web from increasing cumulatively, whereby a substantially constant phase relation between said indicia and said point is maintained.

16. A material feed control comprising the combination of a device for feeding a continuous web of material past a predetermined point, said web having indicia in spaced relation thereon, said device including a deformable member arranged to vary the rate of web feed, a control assembly for causing said member to function, a mechanism responsive to a change of phase relation of said indicia to said point for actuating said control assembly to restore said phase relation, and means to prevent the amplitude of rate change on said web from increasing cumulatively, whereby a substantially constant phase relation between said indicia and said point is maintained.

17. A material feed control comprising the combination of a device for feeding a web of material past a predetermined point, said web having indicia in spaced relation thereon, a mechanism for increasing and decreasing the rate of web feed, means responsive to a change in phase relation of said indicia to said point to actuate said mechanism to both increase and decrease the rate of web feed, means associated with said responsive means to prevent the amplitude of rate change on said web from increasing cumulatively, and means controlled by said preventing means for automatically changing the rate of web acceleration or deceleration according to conditions.

18. In a material feed control comprising the combination of a device for feeding a web of material past a predetermined point, said web having indicia thereon arranged in spaced relation, each indicia consisting of two abutting opaque fields of color contrasting with each other and with the web, and means responsive to the fields of each indicia for respectively controlling the rate of travel of said web.

19. A material feed control comprising means for rotatably mounting a roll formed of a web of material, a device for feeding said web past a predetermined point, said device including a deformable roller contacting with said web for increasing and decreasing the rate of feed according to requirements, said web having indicia thereon for respectively registering with said point, and means coacting with said indicia for automatically deforming said roller according to feed variations whereby said indicia are maintained in registering relation.

ALAN B. FITZ GERALD.